United States Patent [19]

Cook

[11] 4,057,072

[45] Nov. 8, 1977

[54] UNLOADER VALVE

[76] Inventor: James E. Cook, 418 Rice St., Anoka, Minn. 55303

[21] Appl. No.: 663,758

[22] Filed: Mar. 4, 1976

[51] Int. Cl.² ............................................. F16K 17/04
[52] U.S. Cl. .................................... 137/116; 137/514
[58] Field of Search ..................... 137/115, 116, 116.3, 137/116.5, 505.22, 505.26, 540, 542, 509, 505.29, 505.35, 505.41, 514; 251/63.5, 61.5

[56] References Cited

U.S. PATENT DOCUMENTS

| 906,508 | 12/1908 | Carroll | 137/505.29 |
|---|---|---|---|
| 3,168,108 | 2/1965 | Patrick | 137/542 |
| 3,331,583 | 7/1967 | Baker | 251/63.5 |
| 3,411,523 | 11/1968 | Lapera | 137/116.5 |
| 3,451,416 | 6/1969 | Nyberg | 137/116 |

FOREIGN PATENT DOCUMENTS

| 571,689 | 2/1924 | France | 137/505.29 |

Primary Examiner—Robert G. Nilson

Attorney, Agent, or Firm—Merchant, Gould, Smith, Edell, Welter & Schmidt

[57] ABSTRACT

A valve housing has opposed inlet and outlet ports connected by a straight through first passageway. A one-way check valve is mounted in the passageway adjacent the outlet port. A bypass port communicates with the first passageway by means of a second passageway having an inner end providing a valve seat for a bypass valve element in the first passageway. The bypass valve element is connected to a piston movable in a cylindrical chamber in the housing and dividing the chamber into a pressure chamber portion and an outer chamber portion, the outer chamber portion communicating with the exterior of the housing. The piston and bypass valve element are yieldingly urged toward valve closing engagement of the bypass valve element with the valve seat by spring means in the outer chamber portion, the housing further defining a third passageway extending from the first passageway adjacent the outlet port to the pressure chamber portion.

3 Claims, 4 Drawing Figures

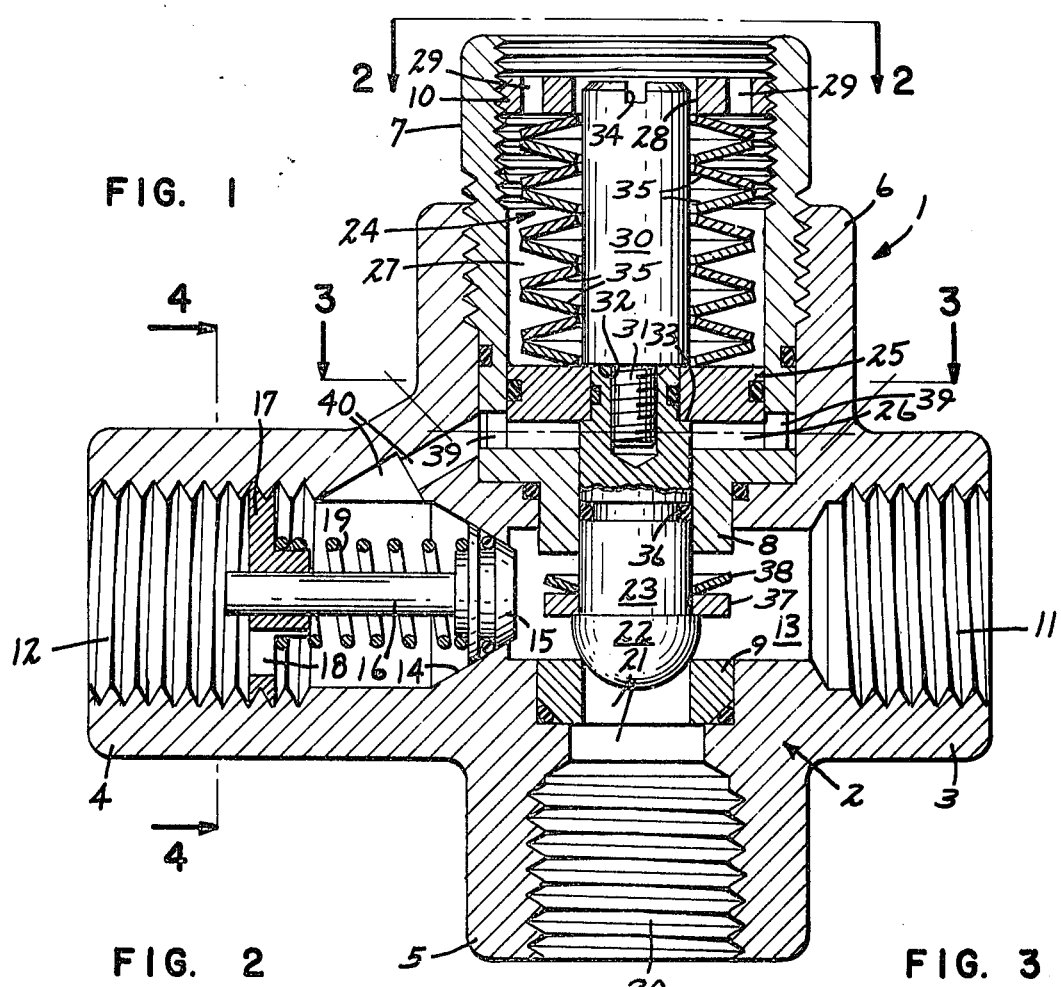
FIG. 1
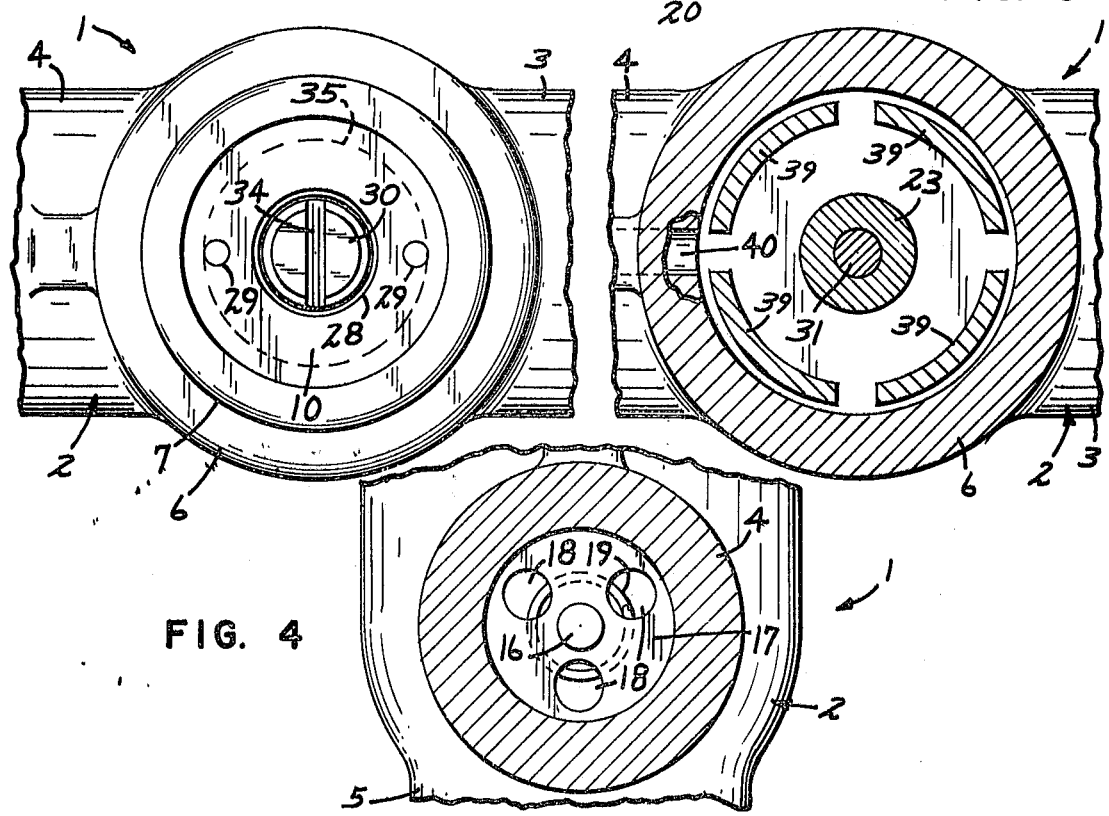
FIG. 2  FIG. 3
FIG. 4

UNLOADER VALVE

SUMMARY OF THE INVENTION

The improved unloader valve of this invention involves housing means having aligned inlet and outlet ports and defining a straight through first passageway connecting the inlet and outlet ports. A one-way check valve is disposed in the passageway adjacent the outlet port. The housing means further defines a bypass port, a second passageway connecting the bypass port with the first passageway, a valve seat at one end of the second passageway and at one side of the first passageway, and a cylindrical chamber axially aligned with the valve seat. A piston in the cylindrical chamber divides the chamber into an inner pressure chamber portion and an outer chamber portion open to the exterior of the body means. The body means further defines an opening between the pressure chamber portion and the first passageway, and a third passageway communicating at one end with the first passageway between the outlet port and said check valve and at its other end with the pressure chamber portion. A bypass valve element is disposed in the first passageway and has a stem extending through the opening and connected to said piston, the bypass valve element being movable with the piston toward and away from valve closing engagement with the valve seat. Yielding means in the outer chamber portion yieldingly urges the piston and bypass valve element in a valve closing direction.

DESCRIPTION OF THE DRAWINGS

FIG. 1 is a view in longitudinal section of the unloader valve of this invention;

FIG. 2 is a fragmentary view in top plan, as seen from the line 2—2 of FIG. 1;

FIG. 3 is a fragmentary section taken on the irregular line 3—3 of FIG. 1; and

FIG. 4 is a fragmentary section taken on the line 4—4 of FIG. 1.

DETAILED DESCRIPTION OF THE PREFERRED EMBODIMENT

The unloader valve of this invention involves housing means indicated generally at 1, including a generally cruciform housing member 2 having opposed arms 3 and 4 and other opposed arms 5 and 6 disposed generally normal to the arms 3 and 4; a tubular housing element 7 screw threaded into the arm 6; a flanged bushing 8; an annular member 9; and an annular nut 10 screw threaded into the outer end portion of the tubular housing element 7.

The arms 3 and 4 are hollow and are internally threaded to define respective inlet and outlet ports 11 and 12 that are connected by a straight-through fluid passageway 13. The passageway 13 is formed to provide a valve seat 14 for a sealing ring-equipped one way check valve 15 having an axially projecting stem 16 that slidably extends through an axial opening in a bearing member 17 screw-threadedly received in the outlet port 12. The bearing member 17 is provided with a plurality of circumferentially spaced openings 18 for passage of fluid therethrough. A coil compression spring 19 is interposed between bearing member 17 and check valve 15 to yieldingly urge the valve 15 toward seating engagement with the valve seat 14.

The arm 5 defines a screw threaded bypass port 20 that communicates with the fluid passageway 13 by means of a second passageway 21 that extends through the housing member 2 and annular memeber 9 in a direction normal to the passageway 13. The annular member 9 provides a valve seat for a bypass valve element 22 having an elongated stem 23 that is axially slidably mounted in the bushing 8. The valve element 22 and its stem 23 are axially aligned with the passageway 21, as shown in FIG. 1.

The tubular housing element 7, bushing 8 and annular nut 10 cooperate to define a cylindrical chamber 24 that is axially aligned with the second passageway 21, and which has axially slidably mounted therein a piston 25 which divides the chamber 24 into an axially inner pressure chamber portion 26 and an outer chamber portion 27 that communicates with the exterior of the housing means 1 through a central opening 28 and a pair of circumferentially spaced openings 29 in the annular nut 10. The openings 29 not only serve as communication means between the outer chamber 27 and the exterior of the unloading valve, but are also adapted to be engaged by a conventional pin wrench, not shown, whereby rotation may be imparted to the annular member 10 for moving the same axially within the tubular housing element 7.

As shown in FIG. 1, the upper or outer end of the bypass valve stem 23 is diametrically reduced to be received in a central opening of the piston 25. The piston 25 is clamped between the stem 23 and an axial retainer post 30 having a reduced diameter threaded inner end 31 that is screw threaded into a similarly threaded axial opening in the outer end of the stem 23. The screw threaded end 31 cooperates with the upper portion of the post 30 to define an annular shoulder 32 that engages the upper surface of the piston 25 to securely clamp the piston 25 between the post 30 and an annular shoulder 33 on the stem 23. As shown, the post 30 is loosely received within the opening 28, and at its upper end is provided with a screw driver slot 34 so that the post 30 may be conveniently tightened against the piston 25.

Means for yieldingly urging the piston 25 in a direction to move the bypass valve 22 into seating engagement with the valve seat formed by the annular member 9 comprises a plurality of resilient conical washers commonly known as "Belleville" springs 35. The springs 35 are mounted on the post 30 and arranged in axial pairs to provide a stack of said springs, the springs of each pair having concave sides in face-to-face relationship. As shown, the springs or washers 35 are interposed between the piston 25 and the inner surface of the annular nut 10. Bypass valve closing bias against the piston 25 may be varied by adjusting the annular nut 10 as well as by varying the number of springs or washers 35 within the chamber 24. The bypass valve stem 23 is formed to provide an annular groove in which is mounted a sealing ring in the nature of a conventional O-ring 36. An annular flange 37 is mounted on the stem 23 adjacent the bypass valve element 22 and supports a Belleville spring 38 that is adapted to engage the adjacent end of the bushing 8 to cushion the valve opening movement of the bypass valve element 22.

At its inner end, the tubular housing element 7 is formed to provide a plurality of circumferentially spaced arcuate feet 39 that engage the bushing 8 and hold it in position in the housing member 2. A third fluid passageway 40 extends from the axially inner end of the chamber portion 26 to the first fluid passageway 13 between the check valve 15 and the outlet port 12.

Preferably, and as shown, the tubular housing element 7, bushing 8, annular valve seat member 9, and piston 25, are all provided with sealing elements in the nature of commercially available O-rings to prevent leakage therebetween and adjacent portions of the valve structure.

In use, it may be assumed that the inlet port 11 is connected to a source of fluid under predetermined pressure such as a constant delivery pump, that the outlet port 12 is connected to a conduit, not shown, but leading to a delivery valve, not shown, and that the bypass port 20 is connected to a conduit, not shown, but leading to the source of fluid. When the delivery valve connected to the outlet 12 is open and liquid is being delivered to the inlet port 11, liquid forces the check valve 15 open and flows outwardly through the openings 18 to the delivery valve. The washers or springs 35 are so arranged that they will maintain the bypass valve 22 in a closed position when fluid pressure within the passageway 13 remains below a predetermined maximum pressure. When the delivery valve, not shown, is closed, pressure builds up in the passageways 13 and 40 and chamber portion 26 to move the piston 25 and bypass valve in a direction to open the bypass valve element 22, against bias of the Belleville springs 35. Fluid then flows outwardly through the bypass passageway 21 and port 20 back to the source of supply of the fluid until the delivery valve 12 is opened to relieve pressure within the passageway 13.

I have found that the conical spring washers may be advantageously used, not only because they may be easily removed or added or otherwise arranged to provide varying bias, but that the spring rate and the action of the conical spring washers makes for smooth and even operating movement of the bypass valve element 22, and keeping valve bounce to a minimum. Coil compress on springs may be substituted for the spring washers 35, if desired, but I have found that smoother action is gained with the spring washers 35. The above described arrangement makes for a compact unit which avoids the ungainly appearance found in the usual unloader valves having exterior springs.

While I have shown and described a commercial embodiment of my unloader valve, it will be understood that the same is capable of modification without departure from the spirit and scope of the invention, as defined in the claims.

What is claimed is:

1. An unloader valve comprising:
   a. valve housing means having aligned inlet and outlet ports and defining a straight-through first passageway connecting said ports;
   b. a one-way outlet check valve in said first passageway adjacent said outlet port;
   c. said housing means further defining, a bypass port, a second passageway connecting said bypass port with said first passageway, a valve seat at one end of said second passageway and at one side of said first passageway, and a cylindrical chamber axially aligned with said valve seat;
   d. a piston in said chamber dividing the chamber into an inner pressure chamber portion and an outer chamber portion open to the exterior of said housing means;
   e. said housing means further defining, an opening between said pressure chamber portion and said first passageway, and a third passageway communicating at one end with said first passageway between said outlet port and said check valve and at its other end with said pressure chamber portion;
   f. a bypass valve element disposed in said first passageway and having a stem extending through said opening and connected to said piston, said bypass valve element being movable with said piston toward and away from valve closing engagement with said valve seat;
   g. yielding means in said outer chamber portion yieldingly urging said piston and said bypass valve element in a valve closing direction, said yielding means comprising a plurality of resilient conical washers arranged in axial pairs to provide a stack of said washers, the washers of each pair having concave sides in face-to-face relationship; and
   h. a conical washer mounted on said bypass valve element stem and positioned to engage said housing means to cushion said bypass valve element during opening movement thereof.

2. The unloader valve defined in claim 1 characterized by a retainer post extending axially from said piston within said outer chamber portion, said post having an inner end portion secured to said bypass valve element and having an annular shoulder engaging said piston, said conical washers being mounted on said post.

3. The unloader valve defined in claim 2 in which said housing means includes an adjustment plate in said outer chamber adjustably movable toward and away from said piston, said conical washers being interposed between said adjustment plate and said piston.

* * * * *